United States Patent
Pecci

[11] Patent Number: 5,156,735
[45] Date of Patent: Oct. 20, 1992

[54] SELF-CLEANING FILTER PARTICULARLY FOR HIGH-VISCOSITY PASTY FLUIDS

[76] Inventor: Giorgio Pecci, Via Curiel 15, 45030 S. Maria Maddalena (Province of Rovigo), Italy

[21] Appl. No.: 583,126

[22] Filed: Sep. 17, 1990

[30] Foreign Application Priority Data

Sep. 22, 1989 [IT] Italy ................. 3627 A/89

[51] Int. Cl.⁵ ............... B01D 29/35; B01D 29/64; B29B 17/02
[52] U.S. Cl. .................... 210/181; 210/413; 210/414; 210/415; 210/488; 210/497.01; 425/197
[58] Field of Search ............... 425/197; 210/413, 414, 210/415, 181, 488, 497.01

[56] References Cited

U.S. PATENT DOCUMENTS

| | | | |
|---|---|---|---|
| 1,772,262 | 8/1930 | Naugle | 210/415 |
| 3,135,193 | 6/1964 | Hunt | 210/415 |
| 3,495,299 | 2/1970 | Chazal | 425/197 |
| 3,585,924 | 6/1971 | Nolan | 210/415 |
| 4,175,198 | 11/1979 | Kinoshita | 425/197 |
| 4,177,234 | 12/1979 | Lowry | 210/415 |
| 4,280,907 | 7/1981 | Haberle | 425/197 |
| 4,309,284 | 1/1982 | Morimoto | 209/273 |
| 4,384,955 | 5/1983 | Nakakura | 210/415 |
| 4,470,904 | 9/1984 | Gail | 210/415 |
| 4,629,411 | 12/1986 | Bueheler | 210/415 |

FOREIGN PATENT DOCUMENTS

| | | |
|---|---|---|
| 5530 | 5/1906 | France . |
| 2567038 | 1/1986 | France . |
| 226317 | 3/1989 | German Democratic Rep. . |
| 3144032 | 6/1988 | Japan . |
| 1037384 | 7/1966 | United Kingdom ........... 210/415 |

*Primary Examiner*—Ivars Cintins
*Assistant Examiner*—Thomas M. Lithgow
*Attorney, Agent, or Firm*—Guido Modiano; Albert Josif

[57] ABSTRACT

The self-cleaning filter particularly for high-viscosity pasty fluids has a fixed body having a substantially cylindrical elongated chamber in which a filtration drum is supported and defines a central region, at one end of which there is an inlet for the fluid to be filtered, and an outer annular region, at the other end of which there is a duct for the removal of the filtered fluid; a shaft is axially supported and rotationally actuated in the chamber and has a helical crest the profile whereof is suitable for grazing the inner surface of the drum to remove therefrom the impurities which are present and is suitable for pushing the fluid toward an impurity discharge duct arranged at the other end of the chamber, the constant cleaning of the drum being suitable for keeping constant the pressure drop on the filter.

10 Claims, 1 Drawing Sheet of a filter according to the invention.

SELF-CLEANING FILTER PARTICULARLY FOR HIGH-VISCOSITY PASTY FLUIDS

BACKGROUND OF THE INVENTION

The subject of the present invention is a self-cleaning filter particularly for high-viscosity pasty fluids.

High-viscosity pasty fluids, such as for example polymers at their liquefaction temperature, are subjected to filtration during their processing in order to remove impurities or foreign substances contained therein.

The presence of a filter in a duct in which a pasty fluid flows usually causes a drop in pressure the value whereof is not constant in time and therefore an amount of product available per unit time is not constant: the occlusion of the openings for the passage of the product, which progressively increases during filtration, in fact alters the flow, and so does the replacement of a dirty filter with a clean one.

If the fluid is processed by a machine after filtration, the pressure and flow rate variation in the flow of the fluid almost always causes a non-uniform characteristic of the finished product.

SUMMARY OF THE INVENTION

The technical aim of the present invention is to obviate the above described disadvantages, i.e. to provide a self-cleaning filter particularly for high viscosity pasty fluids by means of which the filtration conditions remain constant in the course of time.

Within the scope of this technical aim, an object of the present invention is to achieve said aim with a simple structure which is relatively easy to execute in practice, safe to use and effective in operation as well as relatively modest in cost.

This aim and these objects are achieved by the present self-cleaning filter particularly for high viscosity pasty fluids, characterized in that it comprises a fixed body which has a substantially cylindrical elongated chamber in which a filtration drum is supported, said drum defining a central region, at one end of which there is an inlet for the fluid to be filtered, and an outer annular region, at the other end whereof there is a duct for the removal of the filtered fluid, a shaft being axially supported and rotationally actuated in said chamber, said shaft having a helical crest the profile whereof is suitable for grazing the inner surface of the drum to remove therefrom the impurities which are present and is suitable for pushing the fluid toward a duct for the discharge of the impurities which is arranged at the other end of the chamber, the constant cleaning of the drum being suitable for keeping constant the pressure drop across said filter.

BRIEF DESCRIPTION OF THE DRAWINGS

Further peculiarities will become apparent and evident from the detailed description of a preferred but not exclusive embodiment of a filter according to the invention, illustrated only by way of non-limitative example in the accompanying drawings, wherein.

DESCRIPTION OF THE PREFERRED EMBODIMENTS

Figures 1, 2:
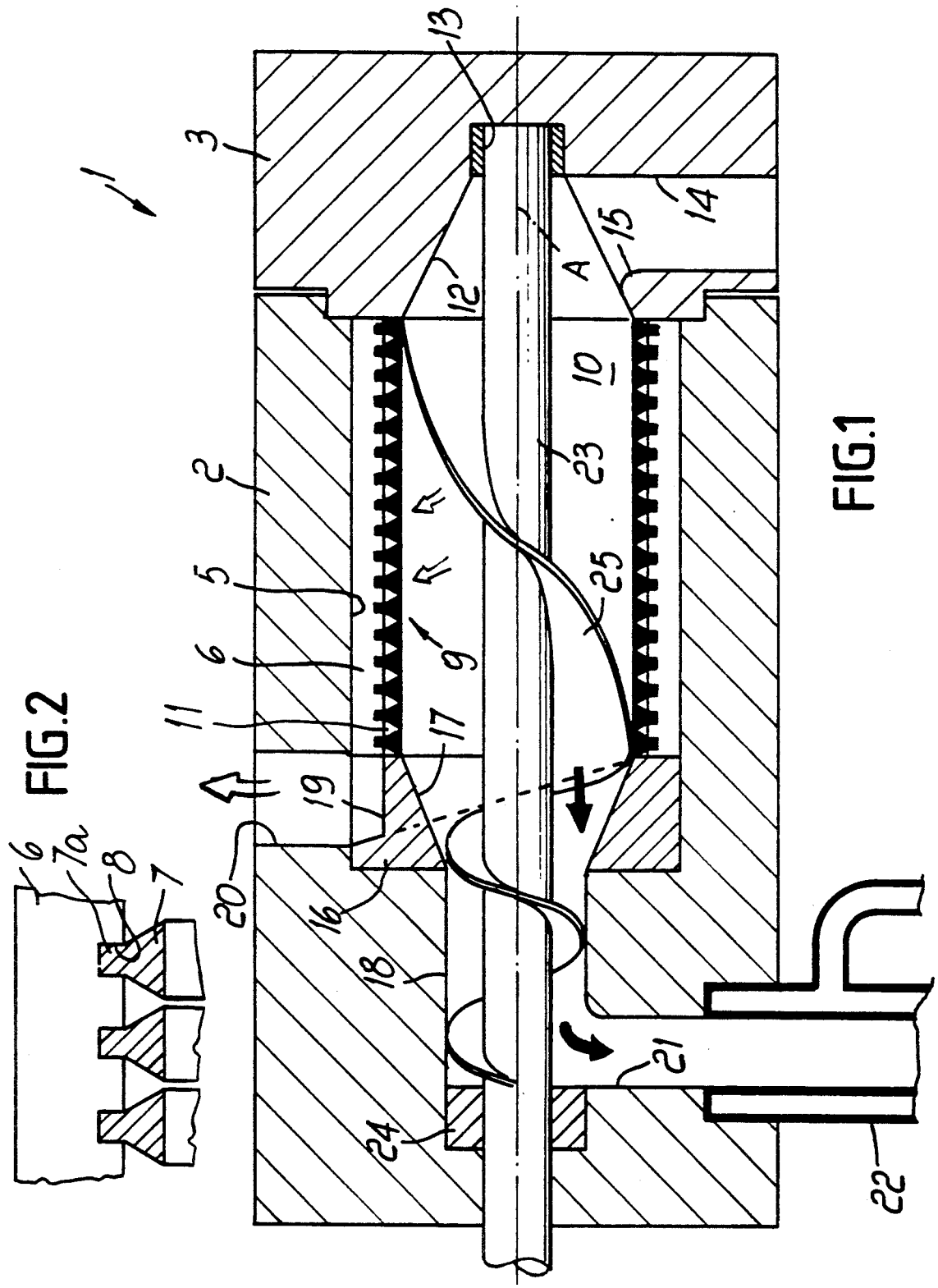
FIG. 1 is a sectional side view, taken along a diametrical plane, of a self-cleaning filter for pasty fluids according to the invention.
FIG. 2 is a partial view of a detail of the filtration drum of the filter according to the invention.

With particular reference to the above figures, the reference numeral 1 generally indicates the self cleaning filter for high-viscosity pasty fluids according to the invention.

The filter 1 is constituted by a fixed body 2 provided with a related closure 3; said body and said closure are mutually coupled by appropriate coupling means, which may be advantageously constituted by longitudinal bolts.

A cylindrical chamber 5 having an axis or chamber axis A is defined in the body 2, and at least three peripheral radial spacers 6 center and lock therein a series of rings 7; said rings 7 have a substantially trapezoidal cross section, the top side whereof extends with a portion 7a having a squared cross section which is suitable for fitting snugly in corresponding notches 8 of the spacers: the relative distances between the bases of the rings define narrow passage ports of a filtration drum generally indicated by the reference numeral 9.

The drum 9 divides the chamber 5 into a central region 10 extending along said chamber axis and being delimited by said rings and into an annular peripheral region 11 defined between said cylindrical chamber 5 between said rings 7 and said fixed body 2: a truncated-cone extension 12 of the region 10 is defined in the closure 3, is axially provided with a cylindrical seat for a bush 13 and is radially provided with an inlet 14 for feeding the pasty product to be filtered (the light colored arrows indicate the product, the black ones indicate the impurities); the input 14 is advantageously blended into 12 by means of the curved surface 15.

A bottom plate 16 is mounted by appropriate mounting means on the bottom of the chamber 5 and is centrally provided with an axial truncated-cone opening 17 which diverges toward the filtration drum 9 and converges toward a reduced-diameter axial extension 18 of the chamber 5; the bottom plate 16 is peripherally provided with a radial dead hole 19 which is aligned with the radial duct 20 defined in the body 2 for the removal of the filtered fluid. The radial hole 19 affects the bottom plate 16 up to the region aligned with the annular region 11 and blends with such profile (the blending being indicated by a broken line).

The external extension 18 is connected to a radial impurity discharge duct 21 which can have, at its output, an outer cooling jacket 22 fed with water.

A shaft 23, rotationally actuated by means not illustrated in the figure, is supported in the chamber axially with respect to A by means Of the bush 13 and of a sealed thrust bearing 24 not illustrated in detail in the figure.

A helical crest or auger 25 extends around and along the shaft 23, and a portion of its profile extends to a point sufficiently close to the inner surface of the filtering drum 9 and the inner surface of the truncated-cone 17 and the inner surface of the axial extension 18; at 17 and 18, to remove therefrom impurities which are present. The pitch of the crest 25 reduces in order to exert a greater thrusting action in the direction of the black arrows.

The operation of the filter according to the invention is as follows: by feeding the product through 14 with a preset pressure, said product is filtered through the ports defined between the rings 7 and is guided through the region 11 toward the filtered product output 20.

The impurities present in the product stop on the surface of the drum 9 and are progressively removed by the action of the profile of the crest 25; the impurities thus removed are conveyed and pushed toward 21 by the crest profiles which operate inside 17 and inside 18.

By cooling the fluid in output with 22 it is possible to slow this outflow of fluid to a greater or smaller extent according to the requirements.

It should be noted that by operating with the device according to the invention the filtration surface is always constantly clean from impurities and therefore no variations in the extrusion pressure due to the jamming conditions of the filter arise; the pressure loss due to the filter remains therefore substantially constant.

It is evident that the filtration characteristics of the filter vary by varying the distances of the rings 7 and therefore the dimensions of the openings which are defined between the various rings.

It has thus been observed that the invention achieves the proposed aim and objects, and in particular that since the filter is constantly kept clean no pressure variations arise due to impurities present thereon.

The invention thus conceived is susceptible to numerous modifications and variations, all of which are within the scope of the inventive concept.

All the details may furthermore be replaced with other technically equivalent ones.

In practice, the materials employed, as well as the shapes and dimensions, may be any according to the requirements without thereby abandoning the scope of the protection of the following claims.

I claim:

1. Self-cleaning filter for high viscosity pasty fluids comprising;
   a fixed body;
   closure means coupled to said fixed body;
   a cylindrical chamber defined axially within said body and defining a chamber axis;
   an inlet for material to be filtered formed radially in said closure means and communicating with said cylindrical chamber;
   a plurality of spaced-apart rings arranged within said chamber coaxially to said chamber axis and each defining a top side, said plurality of rings defining a filtering drum having an inner surface;
   a plurality of annular passage ports defined between said spaced-apart rings;
   a plurality of spacers arranged within said cylindrical chamber parallel to said chamber axis and each engaging said top side of each of said rings;
   an annular peripheral region defined within said cylindrical chamber between said rings and said fixed body,
   a radial outlet duct for filtered material formed in said body and communicating with said annular peripheral region;
   a central region defined within said cylindrical chamber and extending along said chamber axis and being delimited by said rings;
   said closure means defining a truncated cone-shaped extension of said central region coaxially to said chamber axis;
   seat means provided in said closure means on said chamber axis;
   a reduced diameter axial extension of said chamber provided in said body coaxially to said chamber axis opposite to said closure means;
   a radial impurity discharge duct formed in said body and communicating with said axial extension;
   heat transfer means connected to said radial impurity discharge duct;
   means defining a truncated cone-shaped opening interconnecting said central region and said reduced diameter axial extension;
   bearing means accommodated in said body located opposite said seat means along said axis;
   a shaft rotatably supported by said bearing means and by said seat means coaxially to said chamber axis;
   means for rotating said shaft;
   a helical auger extending around and along said shaft from the end of the filter drum nearest the closure means to the impurity discharge duct communicating with said axial extension;
   a profile defined by said auger, said profile extending to a point sufficiently close to said inner surface of said filtering drum, said truncated cone-shaped opening and said reduced diameter axial extension of said chamber, to remove therefrom impurities which are present.

2. Self cleaning filter according to claim 1, wherein said plurality of spacers comprises at least three spacers.

3. Self cleaning filter according to claim 1, further comprising longitudinal bolts, said longitudinal bolts coupling said closure to said fixed body.

4. Self cleaning filter according to claim 1, wherein said rings have a substantially trapezoidal cross section, wherein said top side of each of said rings defines a squared section, and wherein said spacers each have formed therein a plurality of notches, said squared section of each of said rings engaging at least one of said notches of each of said spacers.

5. Self cleaning filter according to claim 1, wherein said heat transfer means comprise at least one water-containing cooling jacket enveloping said radial impurity discharge duct.

6. Self cleaning filter according to claim 1, wherein said bearing means comprise at least one sealed thrust bearing, and wherein said filter further comprises at least one bush, said bush being interposed between said shaft and said seat means provided in said closure means and being arranged coaxial to said cylinder axis.

7. Self cleaning filter according to claim 1, wherein said chamber defines a chamber bottom, and further comprising a bottom plate means, said bottom plate means being mounted in said chamber opposite said closure means and defines said truncated cone shaped opening.

8. Self cleaning filter according to claim 7, wherein said truncated cone-shaped opening, interconnecting said cylindrical chamber and said reduced diameter axial extension, is formed in said bottom plate means.

9. Self cleaning filter according to claim 7, wherein said bottom plate means has formed therein a radial blind hole, said radial blind hole communicating with said annular peripheral region and said radial outlet duct.

10. Self cleaning filter for high viscosity pasty fluids comprising;
    a fixed body;
    closure means coupled to said fixed body;
    a cylindrical chamber defined axially within said body and defining a chamber axis;
    an inlet for material to be filtered formed radially in said closure means and communicating with said cylindrical chamber;

a plurality of spaced-apart rings arranged within said chamber coaxially to said chamber axis and each defining a top side, said plurality of rings defining a filtering drum having an inner surface, each of said rings having a substantially trapezoidal cross section, said top side of each of said rings defining a squared section;

a plurality of annular passage ports defined between said spaced-apart rings;

at least three spacers arranged within said cylindrical chamber parallel to said chamber axis and each engaging said top side of each of said rings;

notches formed in each of said spacers, said squared section of each of said rings engaging at least one of said notches of each of said spacers;

an annular peripheral region defined within said cylindrical chamber between said rings and said fixed body, a radial outlet duct for filtered material formed in said body and communicating with said annular peripheral region;

a central region defined within said cylindrical chamber and extending along said chamber axis and being delimited by said rings;

said closure means defining a truncated cone-shaped extension of said central region coaxially to said chamber axis;

seat means provided in said closure means on said chamber axis;

a reduced diameter axial extension of said chamber provided in said body coaxially to said chamber axis opposite said closure means;

a radial impurity discharge duct formed in said body and communicating with said axial extension;

a chamber bottom defined by said chamber;

a bottom plate means mounted in said chamber opposite said closure means;

a radial blind hole formed in said bottom plate and communicating with said annular peripheral region and said radial outlet duct;

a heat transfer jacket enveloping said radial impurity discharge duct;

said bottom plate means defining a truncated cone-shaped opening interconnecting said central region and said reduced diameter axial extension;

at least one sealed thrust bearing accommodated in said body located opposite said seat means along said axis;

a bush accommodated in said seat means provided in said closure means and being arranged coaxial to said cylinder axis;

a shaft rotatably supported by said bearing means and by said bush and extending coaxially to said chamber axis;

means for rotating said shaft;

a helical auger extending around and along said shaft from the end of the filter drum nearest the closure means to the impurity discharge duct communicating with said axial extension;

a profile defined by said auger, said profile extending to a point sufficiently close to said inner surface of said filtering drum, said truncated cone-shaped opening and said reduced diameter axial extension of said chamber, to remove therefrom impurities which are present.

* * * * *